(12) United States Patent
Makhija et al.

(10) Patent No.: US 7,612,531 B2
(45) Date of Patent: Nov. 3, 2009

(54) DEEP DISCHARGE BATTERY DYNAMIC CHARGING SYSTEM AND METHOD

(75) Inventors: Surender Makhija, Brookfield, WI (US); Kurt Raichle, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 326 days.

(21) Appl. No.: 11/700,098

(22) Filed: Jan. 31, 2007

(65) Prior Publication Data

US 2008/0180066 A1    Jul. 31, 2008

(51) Int. Cl.
*H01M 10/46*    (2006.01)
(52) U.S. Cl. ...................................... 320/128
(58) Field of Classification Search ................. 320/128, 320/133, 142
See application file for complete search history.

(56) References Cited

U.S. PATENT DOCUMENTS 6,072,708 A * 6/2000 Fischer ........................ 363/84
6,118,678 A * 9/2000 Limpaecher et al. ........ 320/166
6,178,101 B1 * 1/2001 Shires .......................... 363/39

* cited by examiner

*Primary Examiner*—Edward Tso
(74) *Attorney, Agent, or Firm*—Baker & Hostetler LLP

(57) ABSTRACT

A system and method of dynamically charging a lead-acid battery that has been in a deep discharged state for an extended period of time or is deeply sulfated includes an alternating current (AC) line input connected to a transformer. The output of the transformer is connected to a pair of silicon-controlled rectifiers (SCRs). The SCRs are in turn connected to terminals of a lead-acid battery. A pair of signal diodes is used to obtain waveform information for the AC input for phase control to trigger the SCRs. The outputs of the signal diodes and the SCRs are connected to a phase regulated output controller. A turn-on time for the SCRs is delayed to create a differential voltage between the transformer output and a voltage of the battery. The differential voltage is applied to terminals of the battery at an increased frequency rate to break battery sulfation.

27 Claims, 3 Drawing Sheets

DEEP DISCHARGE BATTERY DYNAMIC CHARGING SYSTEM AND METHOD

FIELD OF THE INVENTION

The invention relates generally to a system and method of charging batteries. More particularly, the invention relates to a system and method of charging lead-acid batteries that have been in a deep discharged state for an extended period of time and are deeply sulfated.

BACKGROUND OF THE INVENTION

Lead-acid batteries are prone to lead sulfation. Lead sulfation starts when a charging voltage of a fully charged lead-acid battery is removed. Lead sulfate crystals in the battery are converted back to lead during a normal charging cycle. During a normal discharge process, lead and sulfur combine into soft lead sulfate crystals that are formed in the pores and on the surfaces of positive and negative plates inside a lead-acid battery. When a battery is left in a discharged condition, continually undercharged, or an electrolyte level is below the top of the plates or stratified, some of the soft lead sulfate re-crystallizes into hard lead sulfate. This hard lead sulfate is not converted to soft lead sulfate during subsequent recharging. The creation of hard crystals is commonly called permanent or hard sulfation.

When hard sulfation is present, the battery shows a higher voltage than it's true voltage. This may cause a battery to be deemed fully charged by a voltage regulator of a battery charger. This causes the charger to prematurely lower it's output voltage or current, leaving the battery undercharged.

Sulfation accounts for a large percentage of lead-acid battery failures. The longer sulfation occurs, the larger and harder the lead sulfate crystals become. These crystals lessen a battery's capacity and ability to be recharged. Permanent sulfation occurs as the lead-acid battery discharges while in long term storage.

Self-discharge is accelerated by temperature. For batteries that are stored at temperatures over seventy-seven degrees (77°) Fahrenheit/twenty-five degrees (25°) Celsius, the self-discharge rate doubles with an eighteen degree (18°) Fahrenheit/ten degree (10°) Celsius rise in temperature. Thus, sulfation is problem for lead-acid batteries not being used and stored at higher temperatures.

Systems have been designed to charge lead-acid batteries that are deeply sulfated. FIG. 1 is a schematic illustration of a circuit (10) used in prior art battery charging devices for charging lead-acid batteries that are deeply sulfated. The circuit 10 illustrates an alternating current (AC) line input 12 connected to a transformer 14. The transformer 14 outputs a sinusoidal voltage that is applied to a pair of power diodes 16a, 16b. The output of the power diodes 16a, 16b is applied to a pair of silicon-controlled rectifiers (SCR) 18a, 18b. A rectified direct current (DC) output 20 of the SCRs 18a, 18b is applied to terminals (not shown) of a lead-acid battery (not shown). A phase-regulated output controller 22 is connected to the outputs of the power diodes 16a, 16b and the SCRs 18a, 18b.

One drawback of circuit 10 is that the sinusoidal output voltage of the transformer 14 is applied to the battery terminals at a slowly and steadily increasing rate. This method makes it difficult to break the battery sulfation because a low and steadily increasing voltage does not provide a significant thrust above a voltage of the battery to break the sulfation.

These and other drawbacks exist.

SUMMARY OF THE INVENTION

The foregoing disadvantages are overcome, to a great extent, by the invention, wherein in one aspect a circuit is provided that dynamically charges a lead-acid battery that has been in a deep discharged state for an extended period of time or is deeply sulfated. The circuit includes an alternating current (AC) line input connected to a transformer. The output of the transformer is connected to a pair of silicon-controlled rectifiers (SCRs). The SCRs are in turn connected to terminals of a lead-acid battery. A pair of signal diodes is used to obtain waveform information for the AC input for phase control to trigger the SCRs. The outputs of the signal diodes and the SCRs are connected to a phase regulated output controller.

In accordance with one embodiment of the invention, the AC line input to the transformer is a sinusoidal voltage. The output of the transformer is applied directly to the pair of SCRs. The SCRs output a rectified direct current (DC) to terminals of a lead-acid battery. A pair of signal diodes obtains waveform information regarding the sinusoidal voltage. A phase regulated output controller uses the waveform information to trigger the SCRs. The phase regulated output controller assists in controlling when the sinusoidal voltage is applied to the terminals of the lead-acid battery.

In accordance with another aspect of the invention, a method of dynamically charging a lead-acid battery that has been in a deeply discharged state for an extended period of time and/or is deeply sulfated is provided. An AC input, a sinusoidal voltage, is applied to an input of a transformer. The transformer output is transmitted directly to a pair of SCRs. An output of the SCRs is applied to terminals of a lead-acid battery. A pair of signal diodes obtains waveform information of the AC input for phase control to trigger a pair of SCRS. A phase-regulated output controller controls a turn-on time for the SCRs. A turn-on time for the SCRs is delayed to create a differential voltage between the sinusoidal voltage output by the transformer and a battery voltage at the terminals of the battery. When the differential voltage reaches a predetermined value, the SCRs turn on, thus, applying the voltage to the terminals of the battery. This method is repeated at a rate that is, for example, twice a frequency of a line voltage. This method helps break battery sulfation by applying a voltage that is greater than the battery voltage to stimulate charging of the battery.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Figure 1:
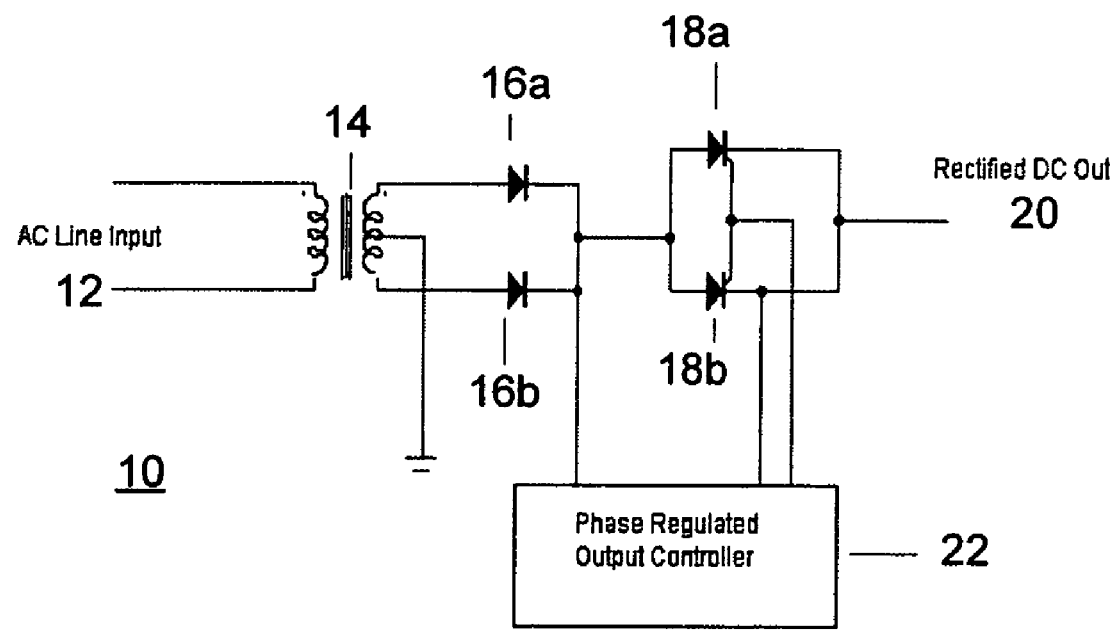
FIG. 1 is a schematic representation of a prior art circuit used for charging lead-acid batteries.

The invention will now be described with reference to the drawing figures, in which like reference numerals refer to like parts throughout. An embodiment in accordance with the invention provides a system and method of dynamically charging a lead-acid battery that has been in a deep discharged state for an extended period of time or is deeply sulfated includes an alternating current (AC) line input connected to a transformer. The output of the transformer is connected to a pair of silicon-controlled rectifiers (SCRs). The SCRs are in turn connected to terminals of a lead-acid battery. A waveform sensor, for example, a pair of signal diodes, is used to obtain waveform information for the AC input for phase control to trigger the SCRS. The outputs of the signal diodes and the SCRs are connected to a phase regulated output controller. A turn-on time for the SCRs is delayed to create a differential voltage between the transformer output and a voltage of the battery. The differential voltage is applied to terminals of the battery at an increased frequency rate to break battery sulfation.

Figure 2:
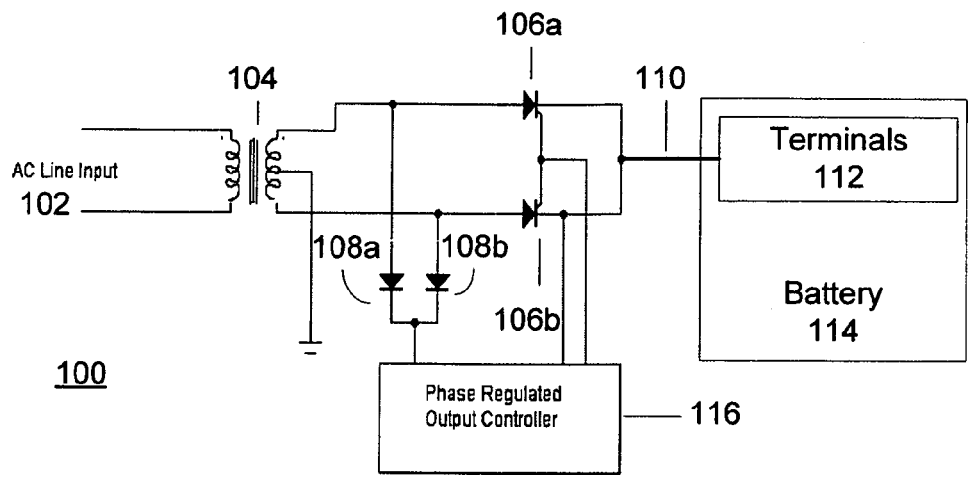
FIG. 2 is a schematic representation of a circuit used for charging lead-acid batteries according to one embodiment of the invention.

FIG. 2 is a schematic representation of a circuit 100 that in some embodiments includes an alternating current (AC) line input 102 connected to a transformer 104. The transformer 104 outputs a sinusoidal voltage that is applied to a pair of silicon-controlled rectifiers (SCR) 106a, 106b. A rectified direct current (DC) output 110 of the SCRs 106a, 106b is applied to terminals 112 of a lead-acid battery 114. A phase-regulated output controller 112 is connected to a pair of signal diodes 108a, 108b and the SCRs 106a, 106b.

The signal diodes 108a, 108b obtain waveform information for the sinusoidal voltage output by the transformer 104. Although signal diodes 108a, 108b are shown, it is to be understood that any suitable waveform sensor may be used. The phase-regulated output controller 112 uses the waveform information and information regarding a voltage of the battery 114 to determine a time delay for the SCRs 106a, 106b. The time delay creates a differential voltage that is applied to the terminals of the battery. The phase-regulated output controller 112 also triggers the SCRs 106a, 106b to turn on after the time delay. The phase-regulated output controller 112 triggers the SCRs 106a, 106b at a rate that is greater than a frequency of a line voltage for the circuit 100. According to one embodiment of the invention, the rate is twice the frequency of the line voltage.

Figure 3:
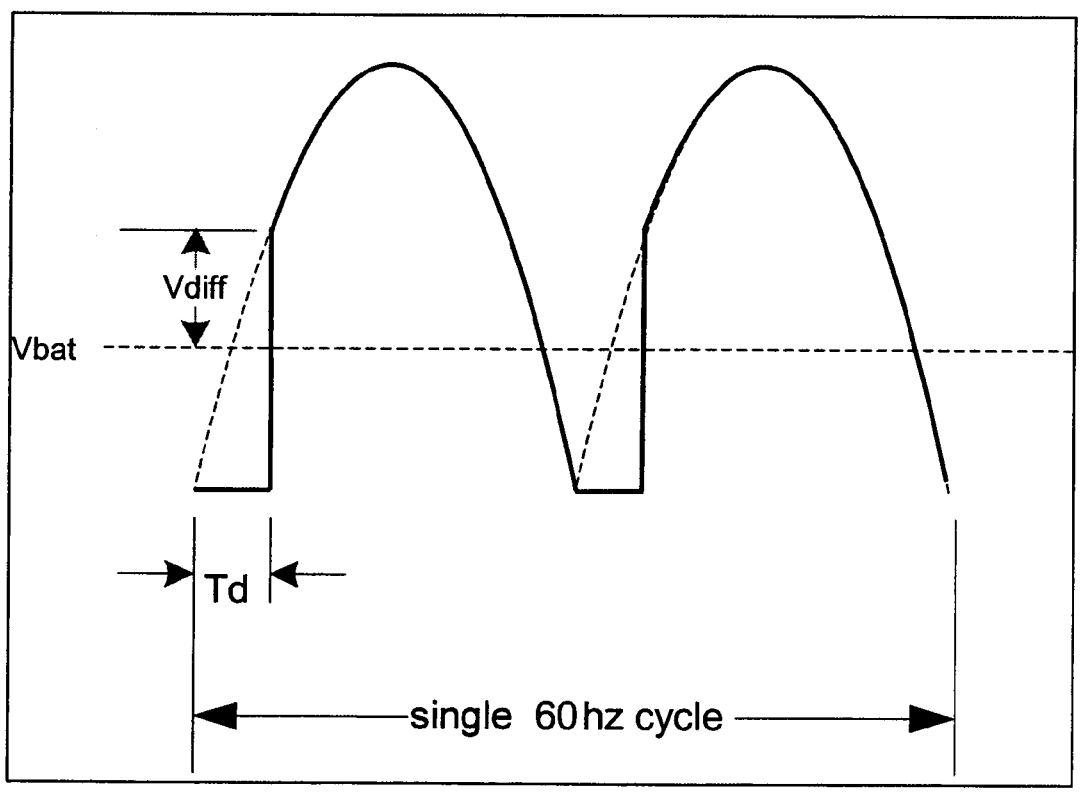
FIG. 3 is a graphical representation of a sinusoidal input voltage applied to a lead-acid battery according to one embodiment of the invention.

FIG. 3 is a graphical representation of a sinusoidal voltage applied to terminals of a lead-acid battery according to one embodiment of the invention. The graphical representation illustrates a single sixty (60) hertz cycle of the sinusoidal voltage. A voltage of a lead-acid battery is denoted as Vbat. The battery voltage may be, for example, 6, 12 or other voltage. A time delay to be applied to the sinusoidal voltage is denoted as Td. As shown in FIG. 3, Td causes a voltage differential Vdiff to be created between the sinusoidal voltage and the battery voltage Vbat. Instead of having the sinusoidal voltage steadily increase through its normal sinusoidal path, each increasing portion of the sinusoidal voltage is delayed by a time Td. Time Td is preferably selected such that an initial voltage of the sinusoidal voltage is greater than the battery voltage Vbat, thus, creating the voltage differential Vdiff. The voltage differential Vdiff is preferably selected based on the battery voltage Vbat, extent of battery sulfation, and/or other factors.

Figure 4:
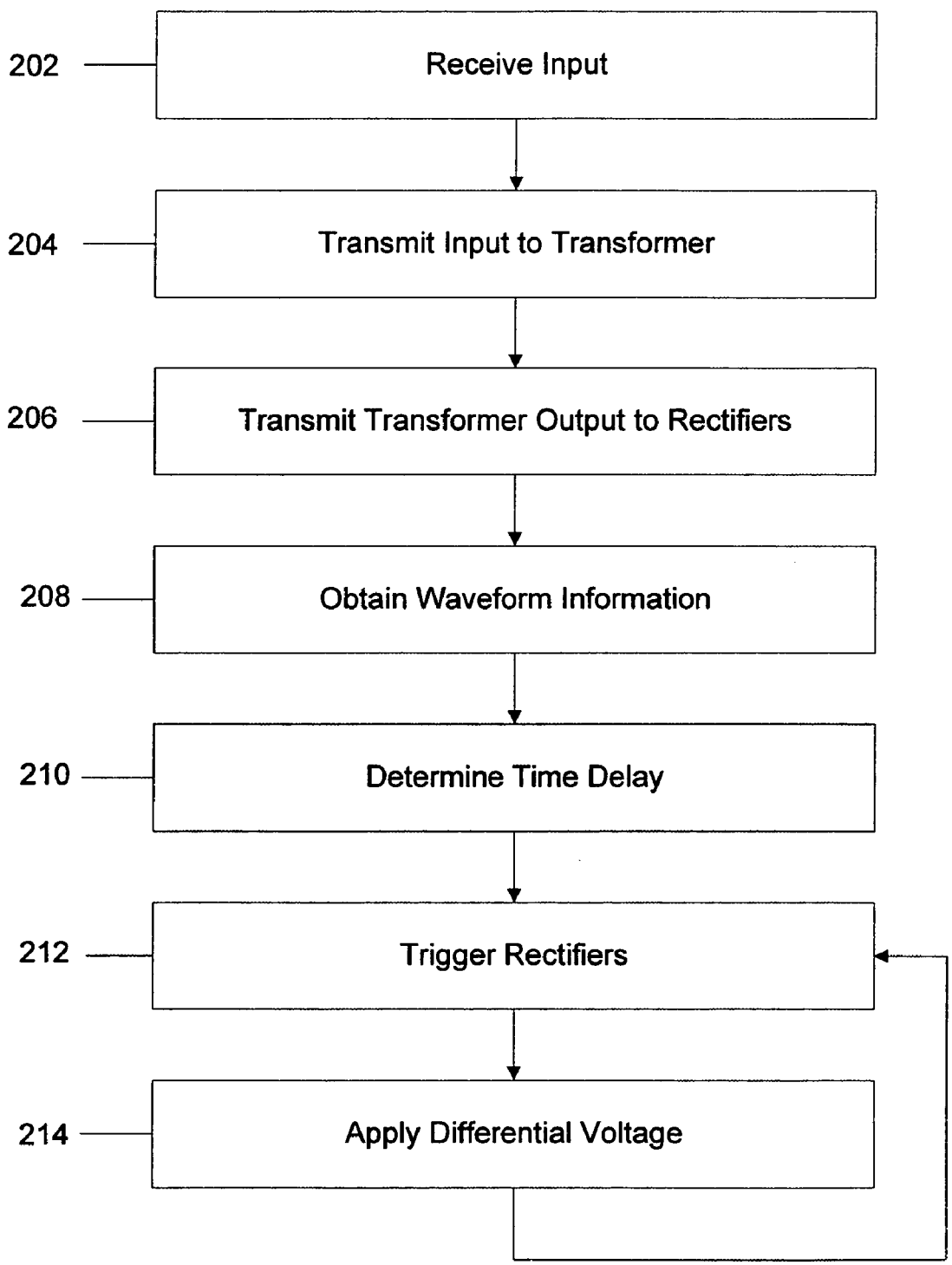
FIG. 4 is a flowchart illustrating a method that may be followed when dynamically charging a lead-acid battery according to one embodiment of the invention.

FIG. 4 is a flowchart illustrating a method 200 that may be followed when dynamically charging a lead-acid battery according to one embodiment of the invention. A lead-acid battery may be dynamically charged by, for example, receiving an input, step 202. The input may be, for example, an alternating current line input. The input may be transmitted to a transformer, step 204. The output of the transformer is applied, preferably directly, to a pair of rectifiers, step 206. According to one embodiment of the invention, the rectifiers are silicon-controlled rectifiers.

Waveform information regarding the output of the transformer is obtained, step 208. According to one embodiment of the invention, the waveform information is obtained using a pair of signal diodes. Based on the waveform information and battery information (e.g., voltage), a time delay is determined, step 210. The time delay may be used to delay when the output of the transformer is applied to terminals of the battery. According to one embodiment of the invention, the input to the battery terminals from the transformer is delayed by controlling when the pair of rectifiers is turned-on.

After the rectifiers are turned-on, step 212, a differential voltage is applied to the terminals of the battery, step 214. The differential voltage is a difference in voltage between the battery voltage and the voltage applied to the battery terminals. The differential voltage may be repeatedly applied to the terminals of the battery to break the battery sulfation. By repeatedly applying the differential voltage, a stimulus is provided that attempts to overcome the battery sulfation and enable the battery to accept a charge.

Although an example of the system and method of dynamically charging a lead-acid battery that has been in a deep discharged state for an extended period of time and/or is deeply sulfated has been described, it is to be understood that other embodiments may also be used. Also, although the system and method are useful for dynamically charging lead-acid batteries, the system and method may be used to perform other functions.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system for dynamically charging a battery, comprising:
   a transformer;
   a node connected to an output of the transformer;

a waveform sensor having an input connected to the node;
at least one rectifier having an input connected to the node; and
a phase-regulated output controller connected to the waveform sensor and a gate input of the at least one rectifier.

2. The system of claim 1, further comprising a plurality of rectifiers.

3. The system of claim 1, wherein the waveform sensor comprises at least one diode.

4. The system of claim 3, wherein the at least one diode comprises a signal diode.

5. The system of claim 1, wherein the at least one rectifier comprises a silicon-controlled rectifier.

6. The system of claim 1, further comprising an alternating current line input.

7. The system of claim 1, further comprising at least one terminal of a battery connected to the output of the at least one rectifier.

8. The system of claim 7, wherein battery is a lead-acid battery.

9. A method of dynamically charging a battery, comprising:
receiving a sinusoidal voltage;
applying the sinusoidal voltage through a node directly to at least one rectifier and directly to at least one waveform sensor;
obtaining waveform information for the sinusoidal voltage;
delaying a turn-on time for the at least one rectifier for a predetermined period of time based on the waveform information;
triggering the at least one rectifier after the predetermined period of time has expired; and
applying a differential voltage to at least one terminal of a battery.

10. The method of claim 9, further comprising repeating the receiving, obtaining, delaying, triggering, and applying.

11. The method of claim 10, wherein the repeating is performed at a rate that is greater than a frequency of a line voltage.

12. The method of claim 11, wherein the rate is at least twice the frequency of the line voltage.

13. The method of claim 9, further comprising determining a time delay for the predetermined period of time.

14. The method of claim 9, wherein the triggering uses a phase-regulated output controller.

15. The method of claim 9, wherein the at least one rectifier comprises a silicon-controlled rectifier.

16. The method of claim 9, wherein the obtaining the waveform information uses at least one signal diode.

17. The method of claim 9, wherein the sinusoidal voltage is output from a transformer.

18. The method of claim 17, wherein an output of the transformer is applied to the at least one rectifier through the node.

19. The method of claim 9, wherein the battery comprises a lead-acid battery.

20. A system of dynamically charging a battery, comprising:
means for receiving a sinusoidal voltage;
means for obtaining waveform information for the sinusoidal voltage;
means for delaying a turn-on time of at least one rectifier for a predetermined period of time based on the waveform information;
means for triggering the at least one rectifier after the predetermined period of time has expired;
means for applying a differential voltage to at least one terminal of the battery; and
means for connecting to an output of the means for receiving a sinusoidal voltage, an input of the means for obtaining waveform information, and an input of the at least on rectifier.

21. The system of claim 20, further comprising a plurality of rectifiers.

22. The system of claim 20, wherein the means for obtaining waveform information comprises at least one diode.

23. The system of claim 22, wherein the at least one diode comprises a signal diode.

24. The system of claim 23, wherein the at least one rectifier comprises a silicon-controlled rectifier.

25. The system of claim 24, wherein the at least one rectifier is directly connected to the output of the means for receiving a sinusoidal voltage.

26. The system of claim 20, further comprising at least one terminal of the battery connected to an output of the at least one rectifier.

27. The system of claim 26, wherein the battery is a lead-acid battery.

* * * * *